United States Patent [19]

Lord et al.

[11] Patent Number: 5,443,230

[45] Date of Patent: Aug. 22, 1995

[54] AIRCRAFT WING/NACELLE COMBINATION

[75] Inventors: Wesley K. Lord, South Glastonbury; Andrea L. Karalus, East Hampton, both of Conn.

[73] Assignee: United Technologies Corporation, Hartford, Conn.

[21] Appl. No.: 171,301

[22] Filed: Dec. 21, 1993

[51] Int. Cl.⁶ .................... B64D 27/00; B64D 29/02
[52] U.S. Cl. .................................... 244/54; 244/55; 244/130
[58] Field of Search .................. 244/53 R, 54, 55, 130

[56] References Cited

U.S. PATENT DOCUMENTS

| | | | |
|---|---|---|---|
| 1,990,606 | 2/1935 | Junkers | 244/54 |
| 3,519,227 | 7/1970 | Brooks | 244/55 |
| 4,449,683 | 5/1984 | Gratzer et al. | 244/55 |
| 4,637,573 | 1/1987 | Perin et al. | 244/54 |
| 4,801,058 | 1/1989 | Mullins | 244/55 |
| 4,867,394 | 9/1989 | Patterson, Jr. | 244/55 |

FOREIGN PATENT DOCUMENTS 2144688  3/1985  United Kingdom ................ 244/54

Primary Examiner—Galen L. Barefoot
Attorney, Agent, or Firm—Gene D. Fleischhauer

[57] ABSTRACT

An aircraft wing 18 and nacelle 24 combination includes a double cambered pylon 28 extending between the wing and the nacelle to support an aircraft engine 22. The pylon includes an airfoil 30 extending in a generally vertical direction having a leading edge 32 and a trailing edge 39. The airfoil is curved away from the aircraft in an axial rearward direction and a portion of the airfoil is curved toward the aircraft in the vertical direction from the nacelle toward the wing.

7 Claims, 2 Drawing Sheets

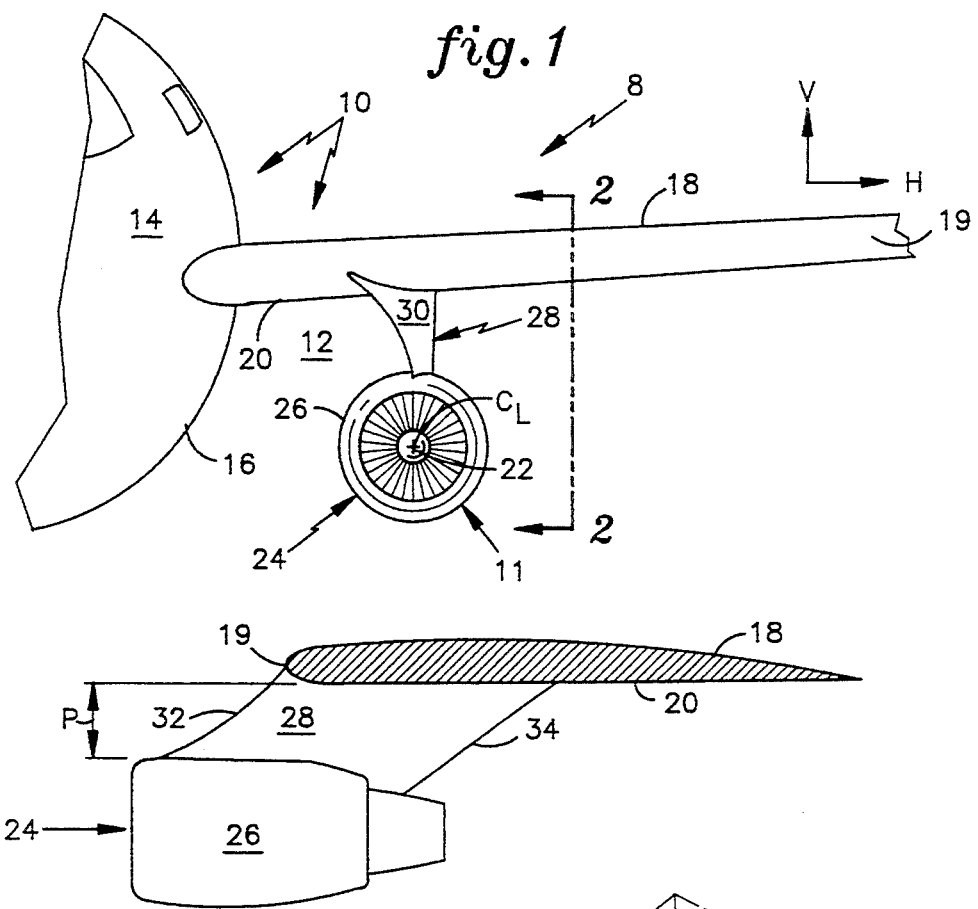
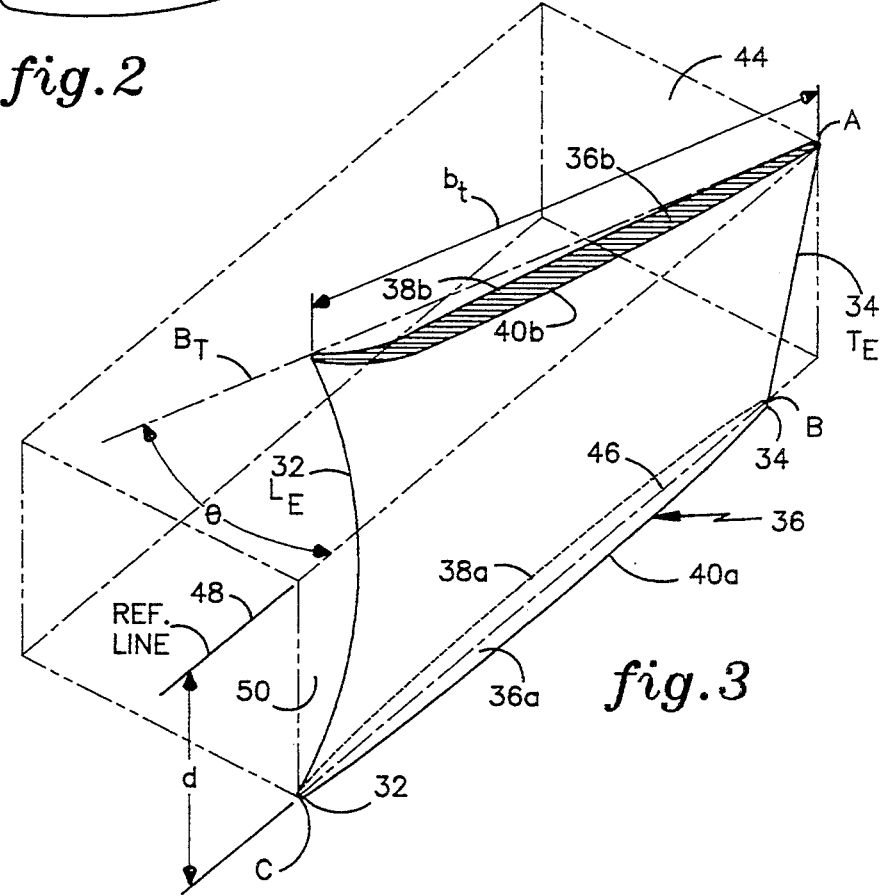

AIRCRAFT WING/NACELLE COMBINATION

TECHNICAL FIELD

This invention relates to an aircraft wing/nacelle combination and more particularly to a pylon which extends between a nacelle and a wing to support an aircraft engine in a subsonic application and to the effect such a combination has on aerodynamic performance.

BACKGROUND ART

Powerplants for airborne vehicles, such as the propulsion system for an aircraft, use a propulsion system assembly which includes an engine disposed in a nacelle. The engine is mounted to the wing of an aircraft by a pylon or similar support structure for subsonic transports. A channel region is formed adjacent the fuselage of the aircraft. The channel region is bounded by a side surface of the fuselage, a wing lower surface between the fuselage and the pylon, an inboard pylon surface and the nacelle.

Typically, the wings of aircraft with engines mounted in the above manner are swept backwards. The wing extends away from the aircraft from the fuselage to the wing tip in the spanwise direction and rearwardly from the front of the wing to the rear of the wing in the chordwise direction. As a result of a combination of effects related to this wing design and fuselage location, airflow tends to flow from the wing's leading edge and spread in the spanwise direction outwardly away from the aircraft fuselage, rather than flowing rearwardly in the chordwise direction.

A portion of the airflow enters the channel region. At relatively high subsonic Mach numbers, which is likely to occur at cruising speeds, this flow in the channel region may become supersonic. As a result, adverse interference drag effects may occur such as shock wave formation and flow separation from the channel surfaces.

In the past structure was added or contoured to manipulate the airflow to reduce aerodynamic losses. For example, U.S. Pat. No.: 4,314,681 to Kutney entitled *Drag-Reducing Component*, describes one past attempt to reduce aerodynamic drag caused by ambient air achieving supersonic velocities in the channel region. In Kutney, a tapered bump is inserted at the inboard intersection between the wing and the pylon or a broadly curved outward fairing is mounted on the pylon's inboard surface.

Another approach is to alter the pylon cross section to form a compression pylon as disclosed in U.S. Pat. No.: 4,867,394 to Patterson, Junior entitled *Compression Pylon*. In this method, the chord length of the pylon is greater than the local chord length of the wing to which it is attached. The cross-sectional area of the pylon progressively increases longitudinally from its leading edge to the local trailing edge of the wing, with the inboard surface of the pylon increasing in distance from the centerline of the pylon. The maximum thickness of the pylon occurs at a point corresponding to the local trailing edge of the wing.

Yet another approach is to camber the pylon as disclosed in U.S. Pat. No.: 4,637,573 to Perin, et alia entitled *Arrowlike Aircraft Wing Equipped with a Highlift System and with a Pylon for Suspending the Engine*. In this method, the upper part of the pylon adjacent to the leading edge of the wing is bent longitudinally inwardly in the front to rear direction toward the longitudinal axis of the aircraft. Other designs are shown in A1AA 90-2015 paper entitled *Design and Analysis of a Large-Plug Inlet ADP Nacelle and Pylon*. This paper mentions cambering a portion of the pylon along a circular arc from the nacelle to the wing and was authored by co-inventor Karalus (A. L. Steiner).

The above art notwithstanding, scientists and engineers working under the direction of Applicant's Assignee are still seeking to improve aircraft aerodynamic performance. Accordingly, interest continues in developing an aircraft having a pylon shaped such that previously encountered adverse drag effects in the channel region are reduced.

DISCLOSURE OF INVENTION

According to the present invention, an aircraft wing-/nacelle combination includes a double cambered pylon extending between the wing and the nacelle to support an aircraft engine, the pylon including a cambered airfoil which extends toward the fuselage over at least a portion of the pylon to divert a portion of the flow away from the channel region.

In accordance with one embodiment of the present invention, the pylon is a three-dimensional airfoil shape having curvature in both the vertical and horizontal directions, the airfoil being curved away from the aircraft in the axial rearward direction and having a portion of the airfoil curved toward the aircraft in the vertical direction from the nacelle toward the wing such that at least seventy (70%) percent of the curvature of the airfoil (as measured with respect to the chord line) occurs in the uppermost one-half of the pylon.

In accordance with one particular embodiment of the present invention, the airfoil has an uppermost portion which is curved toward the aircraft in the vertical direction from the nacelle toward the wing and the lowermost portion (about thirty (30%) percent of the height of the pylon) is not curved.

A primary feature of the present invention is an airfoil having a plurality of adjacent airfoil sections each spaced a distance D from an adjacent airfoil section. The plurality of adjacent airfoil sections includes a first airfoil section which is in close proximity to the nacelle. The plurality of adjacent airfoil sections also includes a second airfoil section spaced by the distance D from the first airfoil section. The second airfoil section has a reference line located within a reference plane comprising point A of the second airfoil section and point B and point C of the first airfoil section. The reference plane passes through points A, B, and C. The reference plane contains the trailing edge of the pylon and intersects the plane of the second airfoil section at the reference line which passes through the point A. The reference line is parallel to line which includes points B and C.

Each airfoil section has a chord line $B_t$ extending through the trailing edge and the leading edge for each chordwisely extending section of the pylon. The chord line $B_t$ is straight and has a length $b_t$ at an angle theta with respect to the reference line of the second airfoil section. The angle theta ranges between about one (1) degree and about five (5) degrees. The angle theta for each succeeding airfoil section increases as the distance from the nacelle increases.

A principal advantage of the present invention is the aerodynamic performance which results from forcing airflow from the channel region by providing a pylon having a double camber. Another advantage is the level of performance of the aircraft which results from avoiding adverse interference drag effects such as shock wave formation and flow separation by allowing less airflow to enter the channel region and redirecting the flow outwardly away from the channel region. Still another advantage of this double cambering design is the ease in which the pylon may be fabricated due to the smooth surfaces of the airfoil.

The foregoing features and advantages of the present invention will become more apparent in light of the following detailed description of the best mode for carrying out the invention and in the accompanying drawings.

BRIEF DESCRIPTION OF DRAWINGS

FIG. 1 is a front elevation view of an aircraft wing/nacelle combination of the present invention.

FIG. 2 is a side elevation view of an aircraft wing/nacelle combination of the present invention taken along the lines 2—2 of FIG. 1.

FIG. 3 is a diagrammatic illustration of two adjacent airfoil sections with the camber of the pylon exaggerated for purposes of illustration.

BEST MODE FOR CARRYING OUT THE INVENTION

Figures 4, 5:
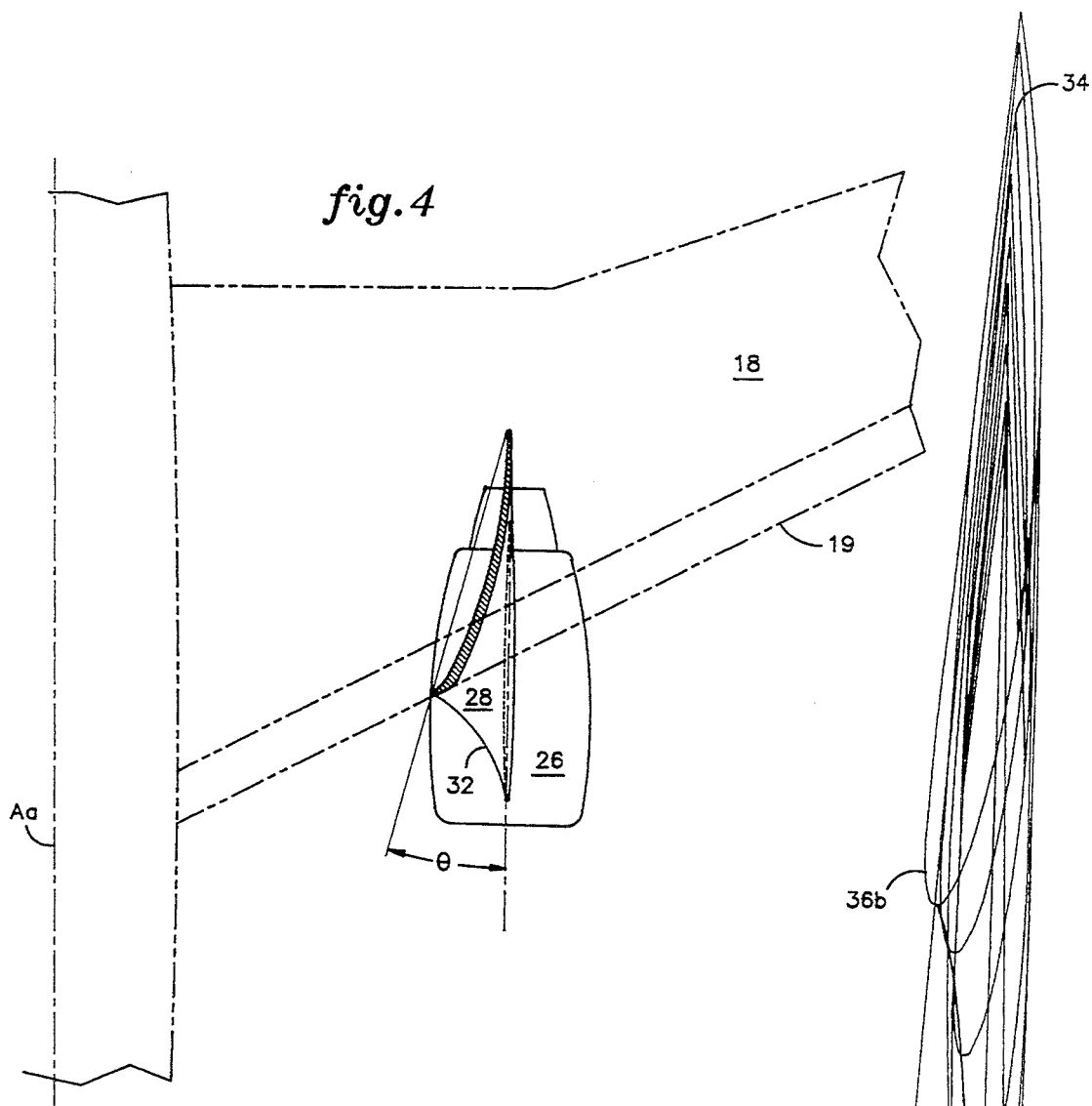
FIG. 4 is a view from above of an aircraft/wing nacelle combination shown in FIG. 3.
FIG. 5 is an illustration of a pylon formed by the airfoil sections of the present invention.

An aircraft 8 having a vertical direction V and a horizontal direction H is shown in FIG. 1. The aircraft 8 includes an airframe 10 and a powerplant 11 for powering the airframe. The powerplant is spaced outwardly from the airframe leaving a channel region 12 therebetween. The airframe 10 has aerodynamic surfaces over which flow exterior to the airframe 10 passes, as discussed below.

The airframe 10 further comprises a fuselage 14 which has a side aerodynamic surface 16. The side aerodynamic surface 16 extends vertically to inwardly bound the channel region 12. A wing 18 is attached to the fuselage 14. The wing extends horizontally from the fuselage 14. The wing 18 has a leading edge 19 and a wing lower surface 20 which bounds a portion of the uppermost part of the channel region 12.

The powerplant 11 includes an aircraft engine 22 and a nacelle 24. The aircraft engine 22 is mounted below the wing 18. The aircraft engine 22 has an engine centerline which is spaced vertically away from the wing 18. A nacelle 24 extends about the aircraft engine 22 and is spaced from the wing 18. The nacelle 24 has a nacelle surface 26 extending vertically to outwardly bound a portion of the channel region 12.

As shown in FIG. 1 and FIG. 2, a pylon 28 extends between the wing 18 and the nacelle 24 to support the aircraft engine 22. The pylon 28 has an airfoil 30 which extends in a generally vertical direction. The pylon has a leading edge 32 and a trailing edge 34, as shown in FIG. 2 and FIG. 3.

The airfoil 30 is curved away from the fuselage 14 of the aircraft 10 in an axial rearward direction. A portion of the airfoil 30 is curved toward the fuselage 10 in the vertical direction as measured from the nacelle 24 toward the wing 18. The airfoil may have a small fillet radius (not shown) adjacent the wing and nacelle for aerodynamic contouring.

For the airfoil shown in FIG. 3, the airfoil 30 is curved away from the aircraft as measured in the downstream direction 18 over at least about the uppermost seventy (70%) percent of the height P of the pylon 28. In addition, the airfoil 30 may have an uppermost portion curved toward the fuselage 10 in the vertical direction from the nacelle 24 toward the wing 18. The uppermost portion may be curved toward the fuselage 14 at the leading edge. At least seventy (70%) percent of the curvature of the pylon is located in the uppermost half of the pylon as measured with respect to the camber of the airfoil. For these constructions, the lower most thirty (30%) percent of the airfoil of the pylon is generally straight between the nacelle and the curved portion of the airfoil.

As shown in FIG. 3, the airfoil 10 has a plurality of adjacent airfoil sections each spaced at a distance D from an adjacent airfoil section 36, as represented by the first airfoil section 36a and the second airfoil section 36b. The airfoil section 36a has a pressure surface 38a which extends from the leading edge 32 to the trailing edge 34 of the airfoil 30. The airfoil section 36a also has a suction surface 40a which extends from the leading edge to the trailing edge. The pressure surfaces and suction surfaces of all the airfoil sections define the suction surface 40 and the pressure surface 38 of the airfoil extending from the nacelle 24 to the wing 18, and from the leading edge 32 to the trailing edge 34 of the airfoil 30. As can be seen, the suction surface 40 is curved away from the fuselage 14 of the aircraft 10 in the rearward direction.

The first airfoil section 36a is in close proximity to the nacelle 24. The first airfoil section 36a has a point C on the leading edge 32, a point B on the trailing edge 34. A straight line 46 extends between the leading edge 32 and the trailing edge 34 of the first airfoil section.

The second airfoil section 36b is spaced by the distance D from the first airfoil section 36a. The second airfoil section 36b has a point A on the trailing edge 34 and a straight line AB is coincident with the trailing edge 34 of the airfoil 30 between points A and B.

The second airfoil section 36b has a reference line 48 lying in the plane of the second airfoil section 44. The reference line 48 passes through the point A located on the trailing edge 34 of the pylon. The reference line 48 is located within a reference plane 50 which extends vertically and which passes through the point A of the second airfoil section and the point B and the point C of the first airfoil section 36a. The reference plane 50 intersects the plane of the second airfoil section 44 at the reference line 48 which passes through the point A. The reference line 48 is parallel to line 46 which includes points B and C.

Each airfoil section 36 has a chord line $B_t$ with a length $b_t$ extending through the trailing edge 34 and the leading edge 32 for each chordwisely extending section of the pylon 28. The chord line $B_t$ intersects the reference line 48 at an angle theta and provides a measure of the relative camber of airfoil section with respect to the other, whether separated by the distance D or A.

FIG. 4 is a view from above of the pylon shown in FIG. 3. In this embodiment, the reference line 46 is parallel to the axis of the aircraft Aa. The angle theta is exaggerated for purposes of illustration. In fact, the angle theta ranges from a very small value to about five (5) degrees. The angle theta for airfoil sections closest to the nacelle at the beginning of the curved portion is small. The angle theta is about five (5) degrees adjacent the surface of the wing as measured between the lowermost airfoil section, closest to the nacelle, and the uppermost airfoil section, closest to the wing. Accordingly, the angle theta for each succeeding airfoil section 36 increases as the distance from the nacelle 24 increases. The airfoil sections 36 so angled form surfaces which force airflow away from the channel region 12.

FIG. 5 is view from above of a pylon made according to the present invention. The pylon has a maximum value of the angle theta which lies in range of from one (1) degree to five (5) degrees as measured between the lowermost airfoil section, closest to the nacelle, and the uppermost airfoil section, closest to the wing. The reference line 46 of the pylon is angled away from the axis Aa of the aircraft in the rearward direction to toe in the nacelle and pylon toward the aircraft. This further increases the aerodynamic effect of relative camber between the airfoil sections. The angle beta between the reference line 46 and the axis Aa is about one (1) degree.

During operation of the aircraft 10 shown in FIG. 1, air is flowed over and around the aircraft 8. Air flowed over the leading edge of the wing is redirected outboard by the angle of the wing. The airflow is divided by the wing and is flowed over the wing upper surface 18 and the wing lower surface 20. The outward flow is disrupted (blocked) by the presence of the pylon 28 under the wing 18 especially at the intersection of the pylon with the wing. The disruption of this flow pattern is acceptable because of the double cambered design of the pylon.

The double cambered pylon 28 allows more airflow over the wing to spill to the outboard side of the pylon 28 than uncambered constructions. The curvature of the airfoil away from the airframe in the rearward direction results in a diversion of a portion of the flow outwardly. This aligns the pylon with the streamlines of the flow extending spanwisely along the wing. It also provides a small divergence of the channel 12 rearwardly. Both of these effects reduce interference drag effects in the channel. Finally the curvature of the leading edge toward the airframe at the uppermost portion to the pylon provides a hooded effect in this critical portion of the channel 12, adjacent the wing, further shielding the channel against the approaching flow. Thus, a confluence of airflow in the inboard channel region 12 at the pylon 28 is avoided. Accordingly, adverse interference drag effects such as shock wave formation and flow separation from channel surfaces are also reduced.

Another benefit of the present invention is that the curvature of the inboard pylon surface will reduce the local Mach numbers. As a result, the possibility of the airflow in the channel region 12 becoming supersonic is greatly reduced.

Another advantage is the ease of fabrication which results from the smooth shape of the contour of the pylon. Such a structure more easily lends itself to fabrication as compared with constructions which employ complex discontinuous constructions.

Although the invention has been shown and described with respect to detailed embodiments thereof, it should be understood by those skilled in the art that various changes in form and detail may be made without departing from the spirit and scope of the claimed invention.

We claim:

1. An aircraft having a vertical direction and a horizontal direction, the aircraft including an airframe and a powerplant for powering the airframe which is spaced outwardly from the airframe leaving a channel region therebetween, the aircraft having aerodynamic surfaces over which flow exterior to the aircraft passes, which comprises:

a fuselage having a side aerodynamic surface which extends vertically to inwardly bound the channel region having an uppermost part and a lowermost part;

a wing which extends horizontally from the fuselage and which is attached to the fuselage, the wing having a wing lower surface which bounds a portion of the uppermost part of the channel region;

a powerplant which includes an aircraft engine mounted below the wing, the aircraft engine having an engine center line which is spaced vertically away from the wing;

a nacelle which extends about the aircraft engine and which is spaced from the wing and which has a nacelle surface extending vertically to outwardly bound a portion of the channel region;

a pylon extending between the wing and the nacelle to support the aircraft engine, the pylon having an airfoil extending in a generally vertical direction having a leading edge and a trailing edge, the airfoil being curved away from the aircraft in an axial rearward direction and having a portion of the airfoil curved toward the aircraft in the vertical direction from the nacelle toward the wing, the airfoil being curved (as measured from the nacelle toward the wing) over at least the uppermost seventy (70%) percent of the pylon.

2. The aircraft of claim 1 wherein the airfoil comprises a plurality of adjacent airfoil sections each being spaced at a distance D from the adjacent airfoil section, each airfoil section having a pressure surface which extends from the leading edge to the trailing edge of the airfoil, a suction surface which extends from the leading edge to the trailing edge of the airfoil and which is curved toward the fuselage of the aircraft extending from the nacelle to the wing.

3. The aircraft of claim 2 wherein the plurality of adjacent airfoil sections includes, a first airfoil section which is in close proximity to the nacelle, the first airfoil section having a point C on the leading edge, a point B on the trailing edge, and a straight line extending between the leading edge and the trailing edge of the first airfoil section; and, a second airfoil section spaced by a distance D from the first airfoil section, the second airfoil section having a point A on the trailing edge such that a straight line AB is coincident with the trailing edge of the airfoil between points A and B; and, a reference line lying in the plane of the second airfoil section and passing through the point A located on the trailing edge of the pylon such that the reference line is located within a reference plane comprising the point A of the second airfoil section and the point B and the point C of the first airfoil section, the reference plane passing through points A, B, and C and intersecting the plane of the second airfoil section at the reference line which passes through the point A, said reference line being parallel to a line passing through points B and C;

wherein each airfoil section has a chord line $B_t$ with a length $b_t$ extending through the trailing edge and the leading edge for each chordwisely extending section of the pylon at an angle theta with respect to the reference line, the angle being selected from a range between one (1) degree and about five (5) degrees; and wherein the angle theta for each succeeding airfoil section increases as the distance from the nacelle increases and the airfoil sections so angled form surfaces which force airflow away from the channel region.

4. The aircraft of claim 1 wherein the material of the airfoil surface is a material selected from the group which comprises aluminum, an alloy of aluminum, or a graphite epoxy material.

5. The aircraft of claim 1 wherein at least seventy (70%) of the curvature of the pylon is located in the uppermost half of the pylon as measured with respect to the camber of the airfoil.

6. A subsonic aircraft having a vertical direction and a horizontal direction, the aircraft including an airframe and a powerplant for powering the airframe which is spaced outwardly from the airframe leaving a channel region therebetween, the aircraft having aerodynamic surfaces over which flow exterior to the aircraft passes, which comprises:

a fuselage having a side aerodynamic surface which extends vertically to inwardly bound the channel region;

a wing which extends horizontally from the fuselage and is attached to the fuselage, the wing having a wing lower surface which bounds a portion of the uppermost part of the channel region;

a powerplant which includes
an aircraft engine mounted below the wing, the aircraft engine having an engine center line which is spaced vertically away from the wing;
a nacelle which extends about the aircraft engine and which is spaced from the wing and which has a nacelle surface extending vertically to outwardly bound a portion of the channel region;

a pylon extending between the wing and the nacelle to support the aircraft engine, the pylon having an airfoil extending in a generally vertical direction having a leading edge and a trailing edge, the airfoil being curved away from the aircraft in an axial rearward direction, the airfoil having a portion of the airfoil curved toward the aircraft in the vertical direction from the nacelle toward the wing such that the airfoil has a plurality of adjacent airfoil sections each being spaced at a distance D from the adjacent airfoil section, each airfoil having a pressure surface which extends from the leading edge to the trailing edge of the airfoil, a suction surface which extends from the leading edge to the trailing edge of the airfoil; and which has a leading edge curved toward the fuselage of the aircraft in a direction extending from the nacelle to the wing;

wherein the plurality of adjacent airfoil sections have
a first airfoil section which is in close proximity to the nacelle, the first airfoil section having a point C on the leading edge, a point B on the trailing edge, and a straight line extending between the leading edge and the trailing edge of the first airfoil section, a second airfoil section spaced by the distance D from the first airfoil section, the second airfoil section having a point A on the trailing edge and a straight line AB which is coincident with the trailing edge of the airfoil between points A and B; the second airfoil section having a reference line lying in the plane of the second airfoil section and passing through the point A located on the trailing edge of the pylon;

wherein the reference line is located within a reference plane comprising the point A of the second airfoil section and the point B and the point C of the first airfoil section, the reference plane passes through points A, B, and C and intersects the plane of the second airfoil section at a reference line which passes through the point A, said reference line being parallel to a line passing through B and C;

wherein each airfoil section has a chord line $B_t$ with a length $b_t$ extending through the trailing edge and the leading edge for each chordwisely extending section of the pylon at an angle theta with respect to the reference line, the angle lying in a range between about one (1) degree and about five (5) degrees with respect to the lowermost airfoil section of the pylon; and, wherein the angle theta for each succeeding airfoil section increases as the distance from the nacelle increases and the airfoil sections so angled form surfaces which force airflow away from the channel region.

7. The aircraft of claim 6 wherein the airfoil is curved toward the aircraft in the vertical direction from the nacelle toward the wing, over at least the uppermost seventy (70%) percent of the pylon.

* * * * *